US 9,540,290 B2

(12) United States Patent
Winslow

(10) Patent No.: US 9,540,290 B2
(45) Date of Patent: Jan. 10, 2017

(54) COMPOST TEA APPARATUS

(76) Inventor: Nathan E. Winslow, Scotland Neck, NC (US)

( * ) Notice: Subject to any disclaimer, the term of this patent is extended or adjusted under 35 U.S.C. 154(b) by 0 days.

(21) Appl. No.: 13/278,901

(22) Filed: Oct. 21, 2011

(65) Prior Publication Data

US 2012/0064618 A1 Mar. 15, 2012

Related U.S. Application Data

(62) Division of application No. 11/307,343, filed on Feb. 1, 2006.

(51) Int. Cl.
*C12M 1/00* (2006.01)
*C05F 17/00* (2006.01)
*C05F 9/02* (2006.01)

(52) U.S. Cl.
CPC ............ *C05F 17/0018* (2013.01); *C05F 9/02* (2013.01); *Y02P 20/145* (2015.11); *Y02W 30/43* (2015.05)

(58) Field of Classification Search
CPC ............ C05F 17/0018; C05F 17/0247; C05F 17/0276; C05F 5/004; C05F 9/02; C05F 9/04; Y02P 20/145; Y02W 30/43
USPC ......... 435/297.2, 290.1, 290.4; 71/6, 23, 11; 366/165.1, 173.1, 173.2
See application file for complete search history.

(56) References Cited

U.S. PATENT DOCUMENTS

| 3,236,743 | A | | 1/1962 | Pierson |
| 3,398,831 | A | * | 8/1968 | Jones ........................ 210/198.1 |
| 3,561,602 | A | | 2/1971 | Molitor |
| 4,342,830 | A | | 8/1982 | Holloway |
| 5,169,782 | A | | 12/1992 | Murphy et al. |
| 5,171,687 | A | | 12/1992 | Moller et al. |
| 6,027,639 | A | * | 2/2000 | Lenhart et al. ............... 210/108 |
| 6,168,949 | B1 | | 1/2001 | Rubenberger |
| 6,335,191 | B1 | * | 1/2002 | Kiplinger ................... 435/252.1 |
| 6,649,405 | B2 | | 11/2003 | Alms et al. |
| 6,727,090 | B1 | | 4/2004 | Hronek |
| 6,767,381 | B2 | | 7/2004 | Huhn |
| 2002/0164781 | A1 | * | 11/2002 | Alms et al. ................ 435/290.1 |
| 2003/0113908 | A1 | | 6/2003 | Hussey, III et al. |
| 2005/0032032 | A1 | | 2/2005 | Pearce et al. |
| 2007/0059819 | A1 | | 3/2007 | Storch |

* cited by examiner

*Primary Examiner* — William H Beisner
*Assistant Examiner* — Danielle Henkel
(74) *Attorney, Agent, or Firm* — DeLeon Parker

(57) ABSTRACT

An apparatus and method of producing compost tea with an elongated container having a vortex chamber, cylindrical screen, and outlet wherein compost is placed inside the vortex chamber, nozzles spray water into the compost chamber under pressure forcing nutrients and micro-organisms from the compost into the water which passes through the screen and out of the outlet into a holding tank.

1 Claim, 14 Drawing Sheets

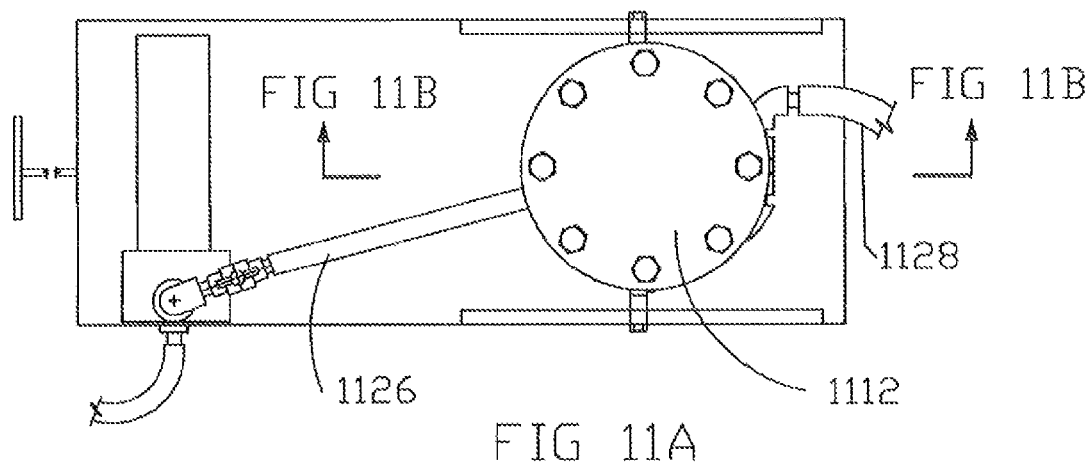
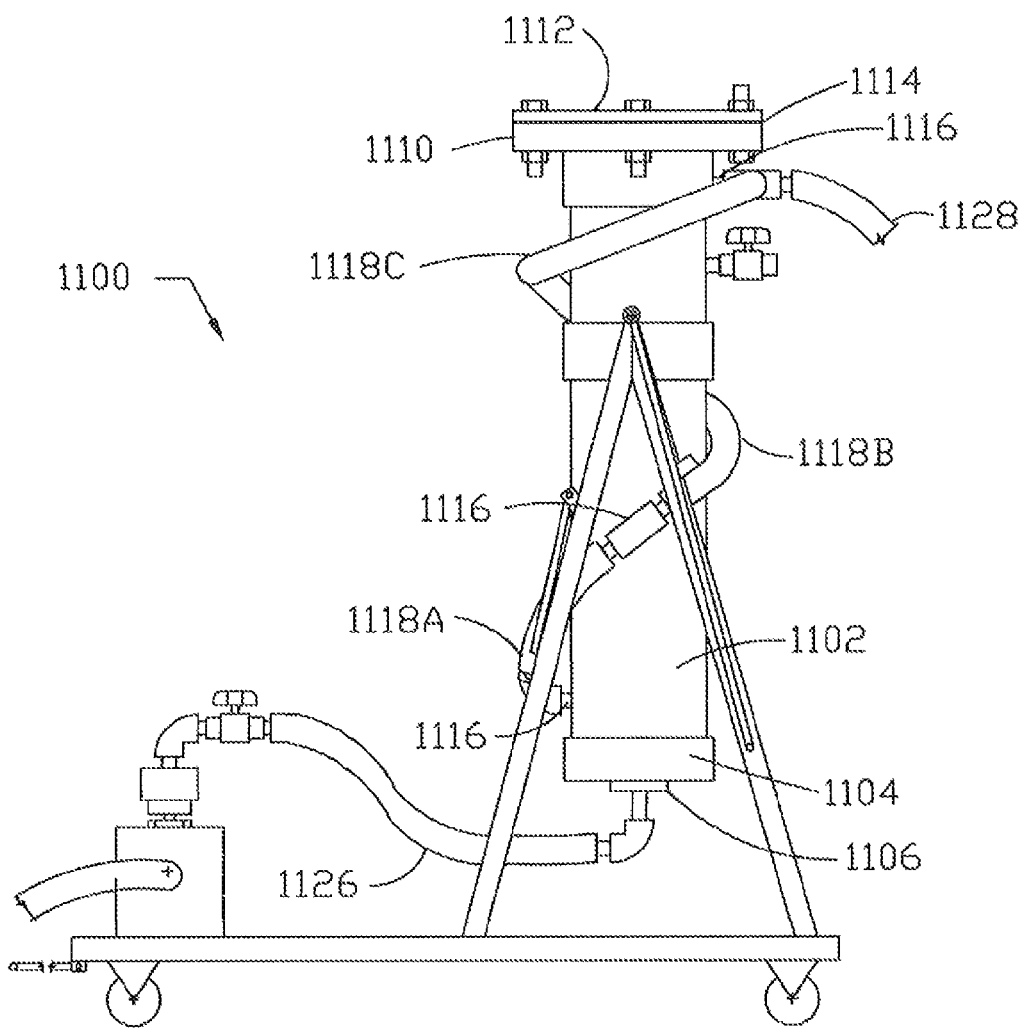

COMPOST TEA APPARATUS

CROSS-REFERENCE TO RELATED APPLICATIONS

This application is a DIVISIONAL of prior non-provisional application Ser. No. 11/307,343, filed Feb. 1, 2006, which is hereby incorporated by reference in its entirety.

This is a DIVISIONAL of application Ser. No. 11/307,343, filed Feb. 1, 2006, publication number U.S. 2007-0175254 A1 now abandoned, which is hereby incorporated by reference in its entirety.

STATEMENT REGARDING FEDERALLY SPONSORED RESEARCH OR DEVELOPMENT

Not Applicable.

BACKGROUND OF THE INVENTION

1. Field of the Invention

This invention relates to compost tea, and more particularly to an apparatus for producing compost tea.

2. Description of Related Art

Compost tea refers to a nutrient and microbially enriched solution used in home and commercial agriculture and horticulture environments. The solution has a diversity of uses and applications, ranging from encouraging plant growth to fighting plant pathogens. The solution is generally produced by removing beneficial nutrients and micro-organisms from existing compost material and mixing them in water. Once produced, one must use the compost tea within a short period of time to ensure that the beneficial micro-organisms, which require an aerobic environment, survive until application. Application consists of spraying the compost tea onto the foliage or the soil, depending on the intended use and desired results.

The benefits of compost tea include elimination of the use of commercially produced fertilizers and pesticides that have long-term detrimental effects on the environment. Since the beneficial ingredients of compost tea are naturally occurring, they promote the development of beneficial organisms and insects which naturally control pests while promoting plant growth. Commercially produced pesticides tend to kill both the pests and beneficial organisms and insects.

Devices and methods of producing compost tea typically involve steeping or leaching the nutrients and organisms from compost material into water. Many devices and methods also utilize an aeration means to ensure an aerobic environment and provide agitation. Simple methods include encasing compost in a cloth or filter media which is then placed in a container holding water. The beneficial nutrients and microbial organisms leach into the water producing compost tea. This method is time consuming, taking days to produce even small quantities of compost tea. Additionally, the results are unpredictable since aerobic conditions may not be maintained. As microorganisms propagate in the tea, they deplete the existing oxygen. If the oxygen is depleted, the microorganisms die making the tea ineffective.

Current practice teaches that improved results occur when the solution is aerated during the leaching process. Aeration, provided by introduction of oxygen or air bubbles into the liquid, provides a continual aerobic environment. This oxygen enriched environment aids the propagation of micro-organisms in the tea. While aeration aids in tea production, the process is still time consuming. Tea production using these methods requires 12 to 24 hours to produce a batch of tea.

Other aerated leaching processes include placing the compost in a trough. The trough may be composed of metal, pipe or similar material with holes cut in the bottom. Compost material is placed in or conveyed through the trough. Water is sprayed on top of the compost. The water leaches through the compost and exits through the holes in the trough. The water is re-circulated until the desired compost tea leachate is produced. In other methods, the compost is conveyed through the trough with an auger. The water is sprayed into the compost by nozzles on the auger. However, these systems still require hours to produce a batch of tea.

An inherent problem with existing compost tea devices and methods is production time. To achieve the most beneficial results, compost tea must be applied within a short time after production to ensure the beneficial micro-organisms survive until application. Generally, this means that the tea must be applied within a day after brewing to prevent spoilage. Such time frames present difficulties for users. Since current methods of compost tea production require almost a day of production time, with an application window of about a day, users must plan application in advance. If the user is unable to apply the tea during the application window the tea will spoil, resulting in lost product. When the product spoils, the user must expend additional resources to produce additional tea for application. Other difficulties arise if weather changes prohibit or stop the application of compost tea. The user must stop application, and if conditions do not change to allow application during the appropriate time frame, the tea will spoil.

The problem of spoilage presents disadvantages for all compost tea users, but is exacerbated for large scale operations requiring several hundred or even thousands of gallons of compost tea. If the operation is unable to use the tea within the required window, the costs of producing replacement tea can be expensive in both increased compost material and labor costs. Changes in weather have a greater impact on large operations since application over hundreds of acres takes time. Some operations try to overcome this limitation by staggering application over several days or weeks. This is also a time consuming process.

Another difficulty for large scale operations is device size and ease of use. Currently, most devices used to produce compost tea require the transfer of the tea from the device to a separate sprayer. In large scale applications, the tea must be transferred to a large sprayer or tote container for application. Until the tea is transferred, the device cannot be utilized to produce additional tea. This transfer process takes additional time and expense. Additionally, devices utilized for large quantity production of compost tea tend to be large, bulky, and are not easily mobile. This lack of mobility means the totes or containers must be hauled from the production area to the application areas. This hauling increases the expense in time, labor and equipment required for production.

Accordingly, what is needed is an invention to produce compost tea in large or small batches in a short amount of time that is portable and easy to use.

BRIEF SUMMARY OF THE INVENTION

It is therefore an object of the present invention to provide a new and improved device and method to produce compost tea.

Another object of the present invention is to provide a compost tea production device capable of producing large or small quantities of compost tea in a short duration.

Yet another object of the present invention is to provide a compost tea production device that is easily portable.

Another object of the present invention is to provide a compost tea production device that does not require transfer of the compost tea into another container after production.

Other objects and advantages of the present invention will be set forth in part in the description and in the drawings which follow, and, in part, will be obvious from the description of may be learned by practice of the invention.

To achieve the foregoing objects, and in accordance with the purpose of the invention as broadly described herein, the present invention provides a portable device that quickly produces compost tea.

The invention comprises an apparatus and method of producing compost tea. Using this method, a water source, pump, a separator container, and a holding tank (hereafter called a "tote") are provided. In this configuration the water source is preferably the tote filled with the desired volume of water. Appropriate means of communication are provided between the water source and pump intake, between pump discharge and the container, and between at lease one container outlet and the holding tank. The container is further provided with a vortex chamber having spray nozzles in communication with the water source from the pump. The nozzles direct their spray into the vortex chamber. The vortex chamber is provided with compost material. The container further has a filter separating the vortex chamber from the outlet. The pump forces water into the vortex chamber through the nozzles under pressure. The nozzle spray soaks the compost filling the vortex chamber with water. The nozzle spray further agitates the compost and creates water and compost slurry. Water pressure forces the water toward the filter which separates the water from the slurry. The water then flows toward the outlet opening. The process of re-circulating water from the tote to the container continues until the desired compost tea is produced.

In a first aspect, the invention comprises a water filled tote container, a container having a top section and a bottom section. The bottom section's inside wall defines a vortex chamber. A plurality of spray nozzles in communication with the tote direct spray into the vortex chamber. The nozzles may be mounted on the vortex chamber wall or directly on a manifold internal to the vortex chamber. A filter is provided in the container separating the vortex chamber from the outlet. A pump having an intake communicates with the tote while a pump outlet communicates to a manifold having a plurality of ports, wherein each port is in communication with one of the plurality of spray nozzles. The top section's discharge outlet communicates with the tote. Lines providing fluid communication between the tote and the pump, and between the pump discharge outlet and the tote, are removable from the tote. In operation, compost material is provided in the vortex chamber. The top section is releasably coupled to the bottom section. When electricity is supplied to the pump, water is pumped from the tote to the spray nozzles. The water forcibly mixes with the compost material, agitating it and separating the beneficial nutrients and micro-organisms from the compost. Water pressure forces the water through the filter screen, toward the container outlet and back to the tote. The compost tea is re-circulated between the tote and the container until the desired levels of nutrients and micro-organisms are obtained. When the desired levels are obtained the pump is shut off, the lines communicating from the tote to the pump and from the top to the tote are removed or otherwise disconnected from the tote, and compost tea production is complete.

In yet another aspect of the invention, the filter comprises a cylindrically shaped screen integrally manufactured into the top section. The filter has a closed end and an open end defining an intake opening. An insert extends from the outer periphery of the intake end and engages into the open end of the container top section. The filter has an outer surface spaced inwardly from the inner surface of the top section creating a circumferential gap in communication with the outlet opening. The intake opening directs the slurry upwards into the filter which separates the water there-from and through the screen and into the circumferential gap communicating with the outlet opening. Wash nozzles are preferably provided to direct water towards the screen and keep it clean.

In another aspect of the invention, the plurality of spray nozzles is mounted on the vortex chamber wall. The filter comprises a filter element having a closed end and an open outlet end defining an outlet opening in communication with the tote. In operation, the container is rotated so that its axis is horizontal. Compost material is provided on a portion of the vortex chamber wall. Water entering the vortex chamber from the nozzles creates water and compost slurry, filling the vortex chamber. Water pressure forces the water through the filter and toward the outlet opening to the tote.

In yet another aspect, the container has a fixed bottom and a removable top. One end of the filter mounts inside the container to the fixed bottom while the removable top adapts to receive the other end of the filter to create a seal during operation. The filter outer surface is spaced slightly inwardly from the container inside wall creating a circumferential gap along the entire length of the container. An internal manifold having an open end, which communicates with a water source, mount to the fixed bottom while the other end of the manifold is capped. A plurality of spray nozzles mounts on the manifold which runs the entire length of the inside of the container. The manifold is positioned inside the filter. Compost is provided inside the filter. Nozzle spray from the manifold soaks the compost and fills the filter with water. Pressure forces water through the filter into the circumferential gap and toward a plurality of outlets communicating with the water source.

In another aspect of the invention, the vortex chamber and pump are affixed to a cart capable of steerage. The cart has wheels to allow free movement of the cart about the ground. A tongue, handle or other linkage device is attached to the cart allowing a user to steer the cart while pushing or pulling on the linkage device. Alternatively, the linkage device could be connected to a hitch of a motorized piece of equipment.

The present invention will now be described with reference to the following drawings, in which like reference numbers denote the same element throughout.

BRIEF DESCRIPTION OF THE DRAWINGS

FIGS. 11A and 11B show a plan and elevation view of a fourth embodiment of the container.

DETAILED DESCRIPTION OF THE INVENTION

Figure 1:
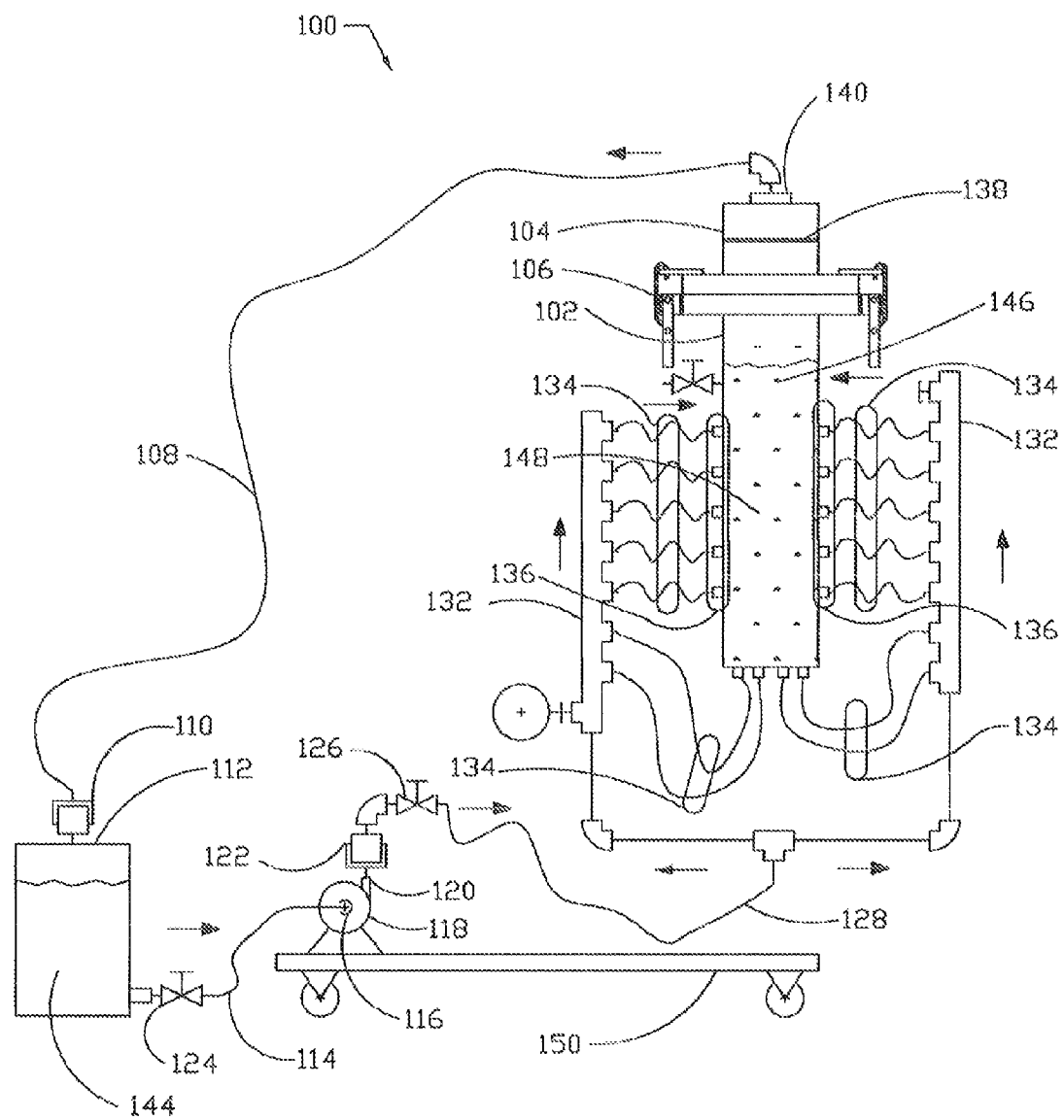
FIG. 1 is a flow diagram showing a process of producing compost tea.

FIG. 1 shows a flow diagram for a process for producing compost tea. An elongated container 100 is provided having a bottom section 102 and a top section 104. A flange assembly 106 releasably secures the two sections. A recirculation line 108 provides communication between the container 100 and a tote 112 provided with water 144. A quick disconnect 110 is provided in the recirculation line 108 to allow easy removal of the tote 112. A pump 118 is also provided having an intake 116 and a discharge 120. A feed water line 114 having a feed water valve 124 provides communication between the tote 112 and the pump 118. The pump 118 and container 100 are preferably mounted on a dolly or cart 150 to allow easy portability of the container 100. A supply water line 128 provides communication between the discharge 120 and one or more multi-port manifolds 132. A quick disconnect 122 and supply line valve 126 are preferably provided in the supply water line 128 facilitating operation. A plurality of nozzle supply lines 134 provide communication between the manifold 132 and a plurality of spray nozzles 136 mounted inside a vortex chamber 148, provided with compost 146 material, defined by the inside of the bottom section 102. Water pressure generated by the pump 118 forces water through the spray nozzles 136 into the vortex chamber 148. Spray from the spray nozzles 136 fills the vortex chamber 148 creating water and compost slurry. The spray nozzles 136 are generally directed circumferentially and in the same direction creating a vortex during operation. A counter-clockwise direction is preferable, enabling the compost tea to obtain a positive charge producing further beneficial results. One or more of spray nozzles 136 may be directed toward the vortex chamber 148 axis to create turbulence and additional agitation. Agitation provided by the vortex and turbulence separates nutrients and microorganisms from the compost 146 and entrains them in the water creating compost tea. Water pressure forces the compost tea through a filter 138 toward the outlet opening 140 which is in communication with the recirculation line 108 and back to the tote 112. After processing the compost 146 remaining in the vortex chamber 148 is removed.

Figure 2A:
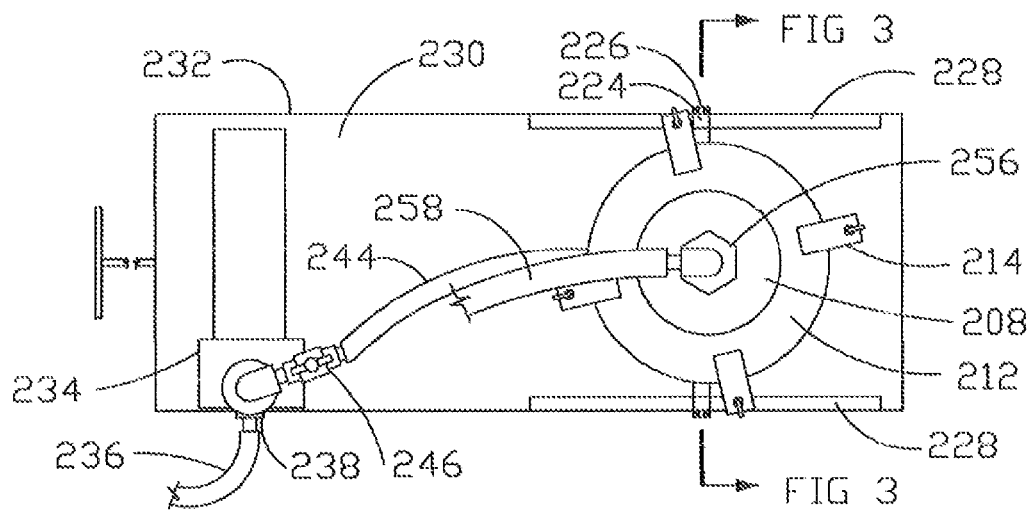
FIG. 2A and FIG. 2B are a plan and elevation view of a first embodiment showing the container and pump on a cart.
Figure 2B:
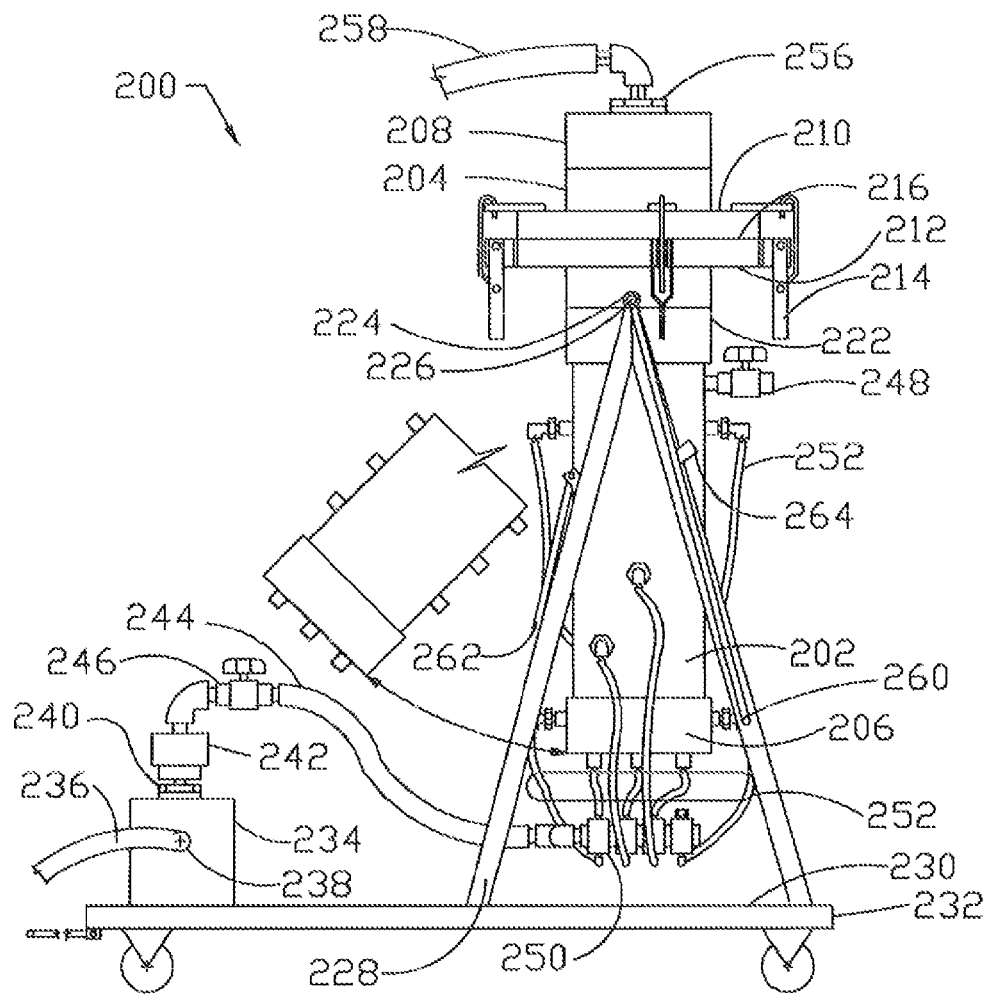

Referring now to FIG. 2A and FIG. 2B, a first embodiment of the apparatus is shown. A generally cylindrical container 200 is provided having a top section 204 and a bottom section 202. The top section 204 has a top cap 208 on one end defining a closed end while the other end has a top flange 210 affixed to the outer periphery of the top section 204. The bottom section 202 has a closed end defined by a bottom cap 206 while the other end is open and having a bottom flange 212 affixed to the bottom section's 202 outer periphery. A series of clamps 214 hingedly affix to the bottom flange 212 and are adapted to engage the top flange 210 so that the top section 204 is removably securable to the bottom section 202. The flanges 210, 212 may also be secured by other suitable means known in the art such as bolts or compression rings. The top flange 210 and bottom flange 212 are adapted to receive a filter assembly 216 there-between. A riser clamp 222 assembly engages the outer surface 220 of the bottom section 202. A hinge assembly 224 having two barrels and a pin 226 with a stop on one end hingedly attaches the riser clamp 222 assembly to an A-Frame 228 mounted to a top surface 230 of a moveable cart 232. A handle 260 affixes to the pin 226 allowing rotation of the container 200 about the rotational axis of the pin 226. A tubular handle support stand 262 has one end hingedly affixed to the A-Frame 228 while the other end adapts to cooperatively support the handle 260. When cooperatively supported, the handle stand 262 supports the handle 260, and therefore the container 200 in an approximately horizontal position. When disengaged, the handle stand 262 rests against the A-Frame 228 and the container 200 rests with its axis vertically. A pump 234 having an intake 238 and a discharge 240 preferably affixes to the cart 232. A feed water line 236 provides communication between the pump intake 238 and a water source, preferably a tote. A supply water line 244 provides communication between the pump discharge 240 and one or more multi-port manifolds 250. The supply water line 244 preferably has a valve 246 and a quick disconnect 242 fitting adapted to engage the pump discharge 240 to facilitate removal of the supply water line 244 when the container 200 is positioned horizontally. A plurality of nozzles mounts inside the container 200. A plurality of nozzle supply lines 252 provides communication between the manifold 250 ports and each nozzle. The container 200 has at least one outlet 256. A recirculation line 258 provides communication between the outlet 256 and the tote. A drain valve 248 mounts to the bottom section 202 facilitating drainage after use.

Figures 3A, 3B:
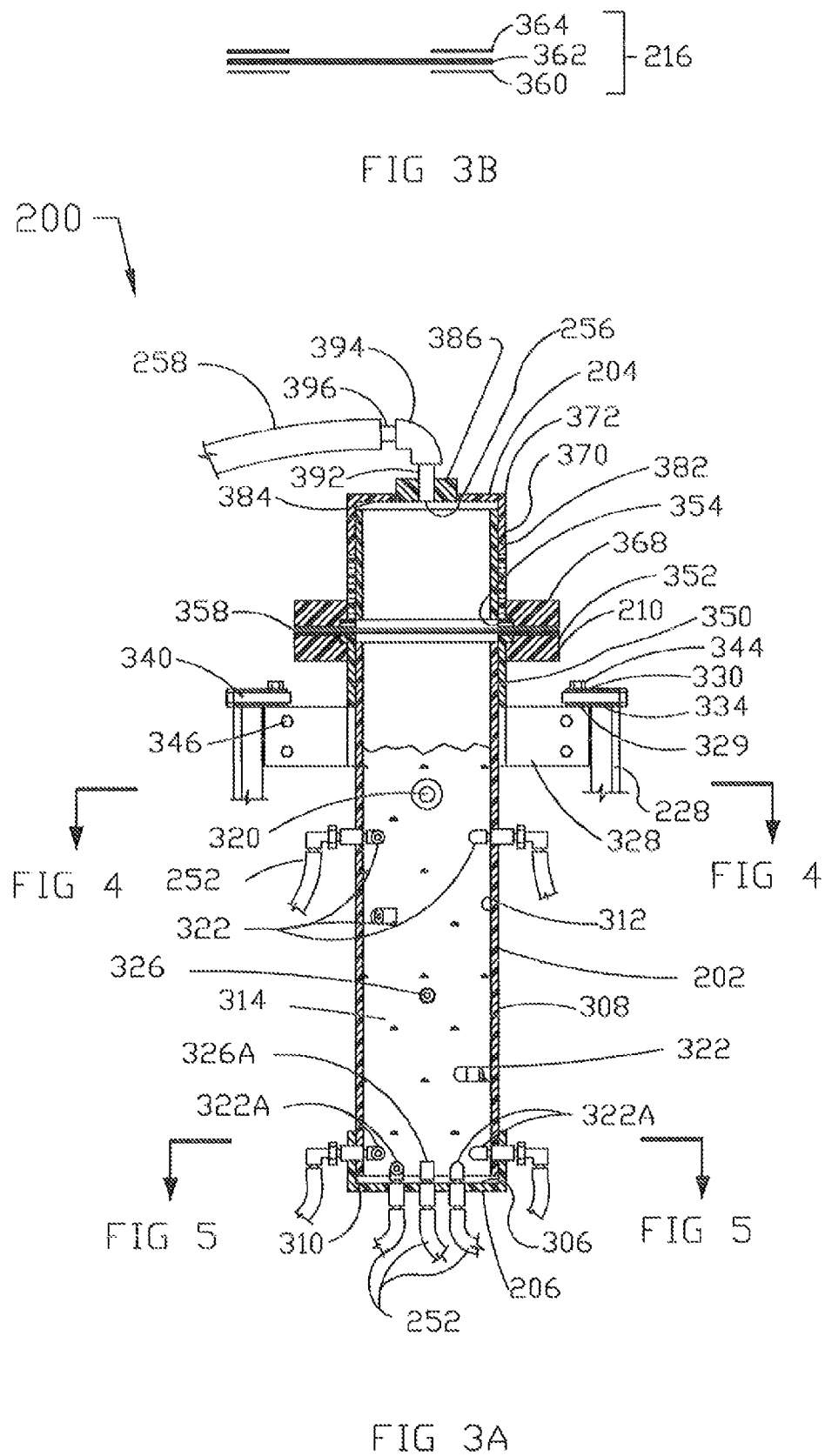
FIG. 3A and FIG. 3B show a cross sectional elevation view of a first embodiment container and filter.

Referring now to FIG. 3A and FIG. 3B in addition to FIG. 2, to further describe the first embodiment, the container 200, top section 204 and bottom section 202 are shown. As described in this embodiment, the container 200 is manufactured from 10 inch schedule 80 PVC pipe and fittings. However, other suitable materials and construction could include carbon or stainless steel, fiberglass, CPVC, or other materials designed to convey or contain fluids under pressure. The bottom section 202 and top section 204 are generally cylindrically shaped. The top section 204 comprises a spool 370 piece having a closed end defined by a top wall 384 of a top cap 372 adapted to receive one end of the spool 370 piece. The other end of the spool 370 piece is open and engages into a sleeve in a top flange assembly 210. The embodiment described herein comprises a Van Stone type flange assembly comprising an insert and a flange ring which is well known in the art of flange devices. Other flange assemblies suitable for use with the container 200 construction material and size may also be used. A bushing mounts on the top section 204 defining an outlet 256. A recirculation line 258 provides communication from the outlet 256 to the tote. In the figure, the bushing 386 adapts to receive a nipple 392. An elbow fitting 394 adapts on one end to receive the nipple 392 and a second nipple 396 on the other end. The second nipple 396 affixes to the recirculation line 258 which line communicates with the tote.

The bottom section 202 has a closed end formed by the bottom cap 206 adapted to receive one end of the bottom section 202. The bottom cap 206 has a wall defining a bottom 306 of the bottom section 202. The other end of the bottom section 202 is open and having the bottom flange assembly 212 affixed thereto. The container 200 has an inner surface 312 that, together with the bottom 306, defines a vortex chamber 314. The inner surface 312 is also referred to as the vortex chamber wall 312 throughout this description. A drain outlet 320 provides communication from the vortex chamber 314 to drain valve 248. A plurality of spray nozzle 322s mounts on the vortex chamber wall 312. The plurality of nozzle supply lines 252 provides communication from the manifold 250 to the spray nozzles 322, 322a, 326, 326a. The spray nozzles 322 are preferably arranged helically and directing their spray in a counter-clockwise circumferential direction so that water directed from the nozzles 322 generates a vortex within the vortex chamber 314. Also, one or more straight nozzles 326 directing spray inwardly toward the container 200 axis are provided to generate additional agitation and turbulence during operation. Two pair of spray nozzle 326a, 322a are preferably mounted on the bottom 306 wherein one pair 322a directs spray circumferentially about the container 200 axis in the same direction as the other plurality of spray nozzles 322 mounted on the vortex chamber wall 312, while the other pair are straight nozzles 326a directing spray upwardly along lines parallel to the container 200 axis. A riser clamp 222 assembly adapted to receive the container's 200 outer wall 308 secures to the container 200 just below the bottom flange assembly 212 wherein the bottom flange assembly 212 comprises an insert 350 and a ring 352. The riser clamp 222 assembly generally consists of two members secured to each other by bolts and are well known in mechanical arts. The riser clamp 222 assembly is hingedly connected to the A-Frame 228 by a hinge assembly 224. The hinge assembly 224 comprises a first barrel 330 affixed to the top outer periphery of the riser clamp 222 and a second barrel 334 affixed to the A-Frame 228. The first barrel 330 and second barrel 334 are adapted to receive the pin 226. The first barrel 330 is adapted to receive a lock screw 344 which, when screwed in, engages the end of the pin 226 inserted into the first barrel 330 coupling the pin 226 to the first barrel 330. The pin 226 rotates freely inside the second barrel 334. This arrangement facilitates rotation of the container 200 about the hinge assembly axis. The bottom flange 212 and the top flange 210 are adapted to receive a filter assembly 216 there-between. Referring now to FIG. 3B, the filter assembly 216 in this embodiment comprises a lower gasket 360 and an upper gasket 364 having a perforated filter screen 362 there-between. The perforated screen 364 is preferably stainless steel sheet having perforations with a diameter of 0.030 inch (thirty-thousandths of an inch). The screen 362 perforations allow communication of nutrient enriched water from the vortex chamber 314 to the top section 204 while retaining the compost solids in the vortex chamber 314.

Figure 4:
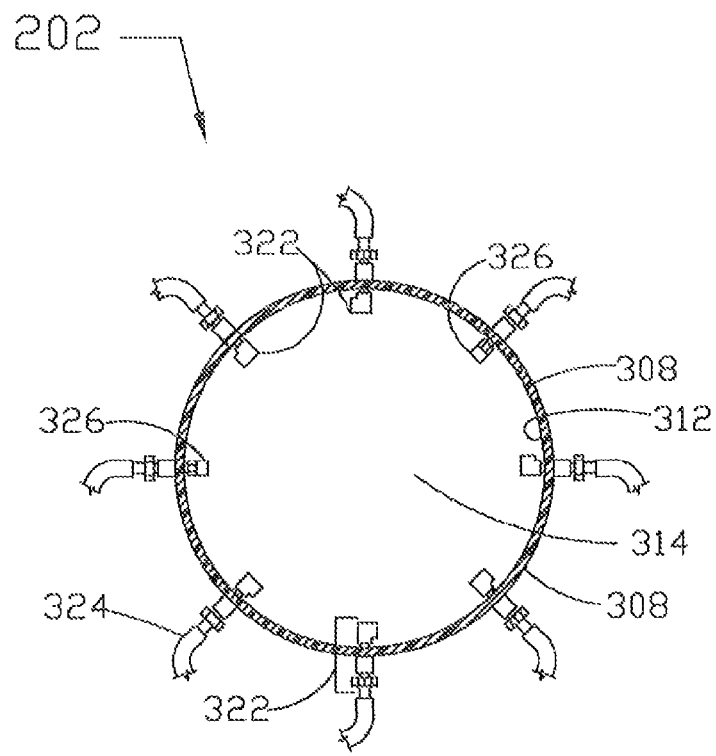
FIG. 4 is a sectional plan view depicting the nozzle arrangement on the container wall.
Figure 5:
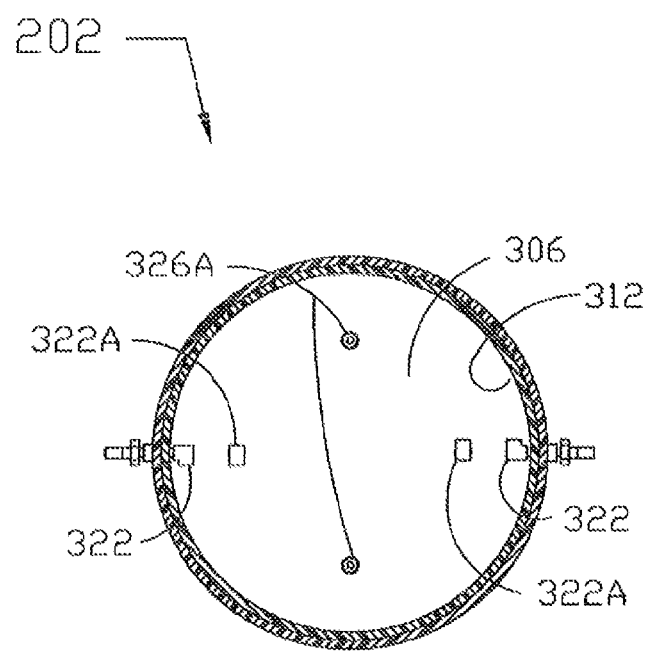
FIG. 5 is a sectional view depicting the nozzle arrangement of the bottom of the bottom section.

FIG. 4 depicts a more detailed view of the lower portion of the bottom section 202 depicting the nozzle arrangement on the vortex chamber wall 312. Referring to FIG. 3A and FIG. 4, the bottom section 202 outer surface 308 and the inner surface 312 defining the vortex chamber 314 are shown. The bottom section 202 adapts to receive the spray nozzle assemblies 322, 326 through holes drilled through the bottom section 202. Each spray nozzle assembly 322, 326 has an end adapted to connect to one of the nozzle supply lines 324 and another end directing spray into the vortex chamber 314. Each nozzle assembly 322, 326 affixes to the bottom section 202 in the openings defined by the drilled holes by glue or other means to provide a watertight seal. Spray nozzles 322, 326 preferably direct spray in the same counter-clockwise circumferential direction to create a vortex during operation. The one or more straight nozzles 326 are preferably provided directing spray inwardly toward the container 200 axis. In practice, approximately 14 nozzles 322, 326 mounted on the vortex chamber wall 312 have been found satisfactory in a container 200 having a bottom section 202 manufactured from 10 inch schedule 80 PVC pipe and having sufficient capacity to hold approximately 30 pounds of compost. Of these 14 nozzles, two straight nozzles 326 have been found to create satisfactory turbulence and additional agitation. However, configurations lacking straight nozzles 326 may also be used satisfactorily. FIG. 5 clarifies nozzle arrangement on the bottom of the container bottom section. Referring to FIG. 3A and FIG. 5 the bottom 306 has the pair of nozzles 322a directing spray circumferentially and the pair of straight nozzles 326a directing spray upwardly along lines parallel to the container 200 axis. These straight nozzles 326a provide additional agitation of compost material preventing settling on the bottom and facilitating thorough mixing of the slurry during operation.

Figure 6A:
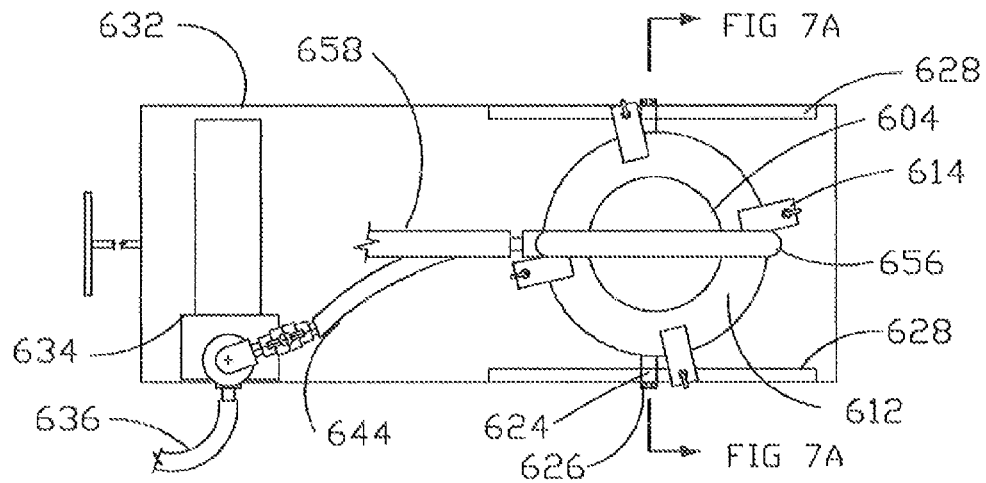
FIG. 6A and FIG. 6B are a plan and elevation view of a second embodiment showing the container and pump on a cart.
Figure 6B:
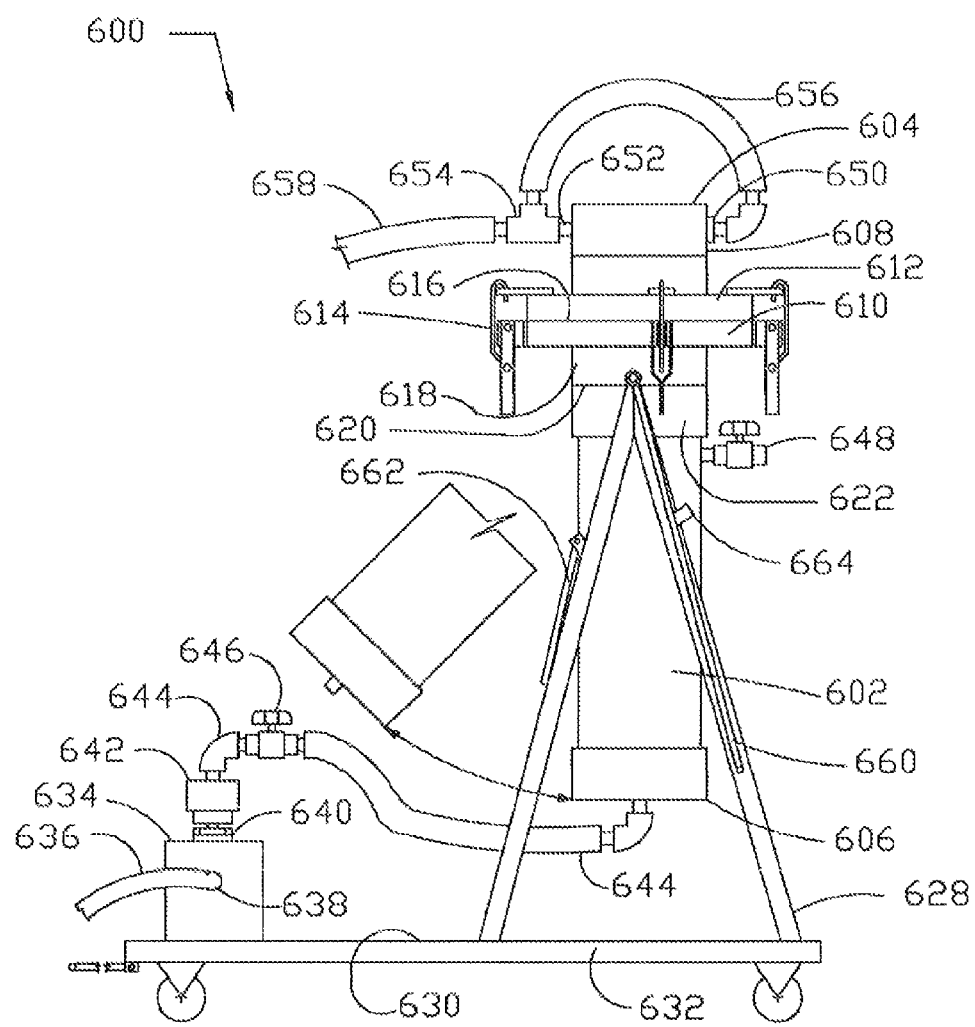

FIG. 6A and FIG. 6B depict a second embodiment of a compost tea apparatus container 600. This embodiment utilizes an internal manifold, a filter means integrated into a removable top section 604, and multiple outlet openings 650, 652. In this embodiment, the configuration of a cart 632, pump 634, supply water line 644, feed water line 636, A-Frame 628, hinge assembly 624, pin 626, riser clamp assembly 622, handle 660, handle support 662, recirculation line 658, top section 604 and bottom section 602, flange clamps 614, and drain valve 648 is essentially the same as previously described in association with FIG. 2 except as hereinafter explained. In this embodiment, spray nozzles are mounted on an internal manifold. Since the manifold is internal to the container the manifold and container are freed from nozzle supply lines. The supply water line 644 communicates with the internal manifold that communicates directly with the spray nozzles. The bottom section 602 has a bottom cap 606 adapted to internally receive the manifold and to externally receive the supply water line 644. The top section 604 differs in that it has a first outlet 650 and a second outlet 652. The second outlet 652 adapts to engage a tee 654 fitting which is further adapted to engage the recirculation line 658 and one end of a loop 656. The first outlet 650 is adapted to engage the other end of the loop 656. The loop provides communication between the first outlet 650 and the recirculation line 658.

Figure 7A:
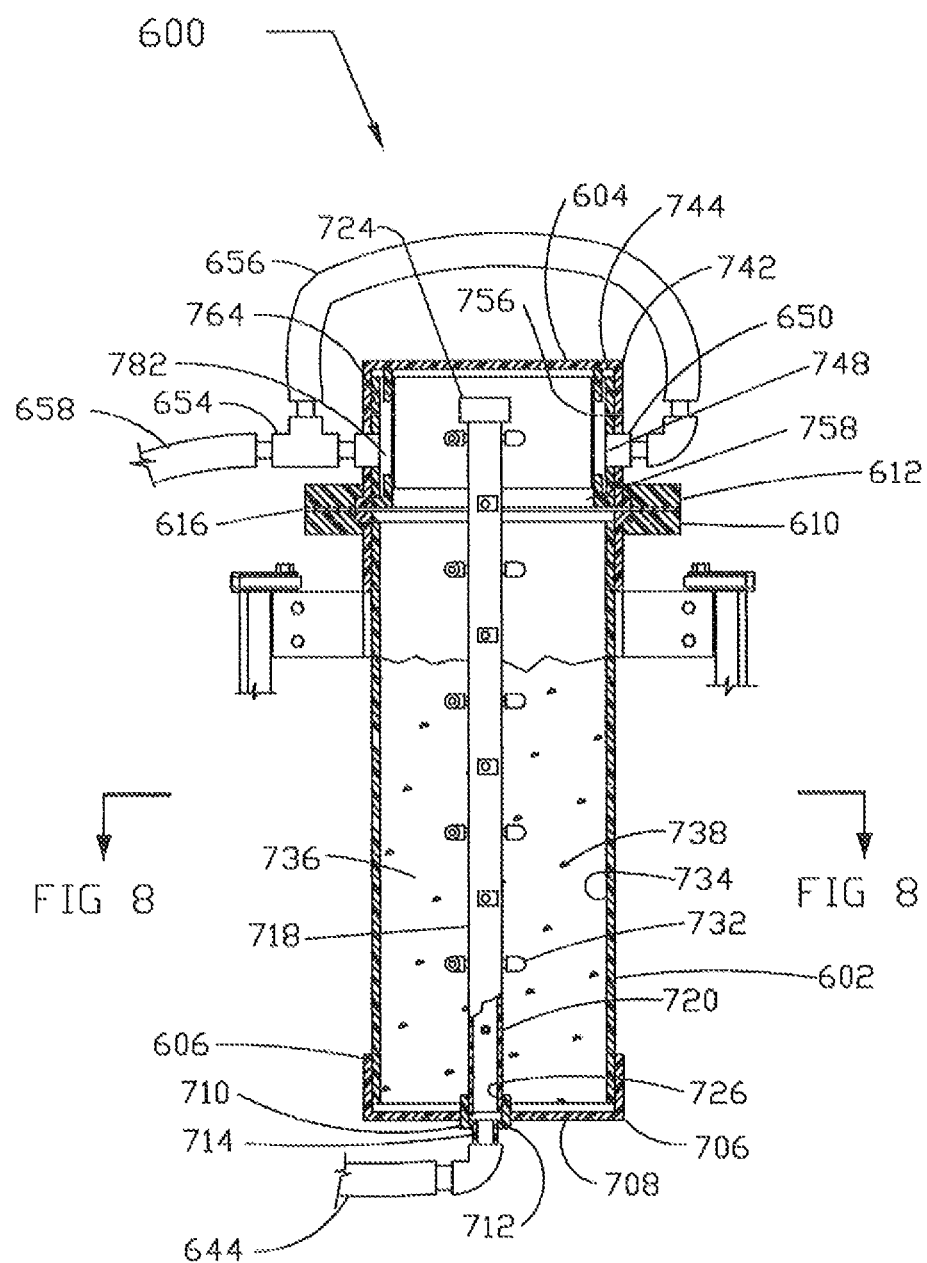
FIG. 7A and FIG. 7B are cross sectional views of a second embodiment having an internal manifold and integral filter.
Figure 7B:
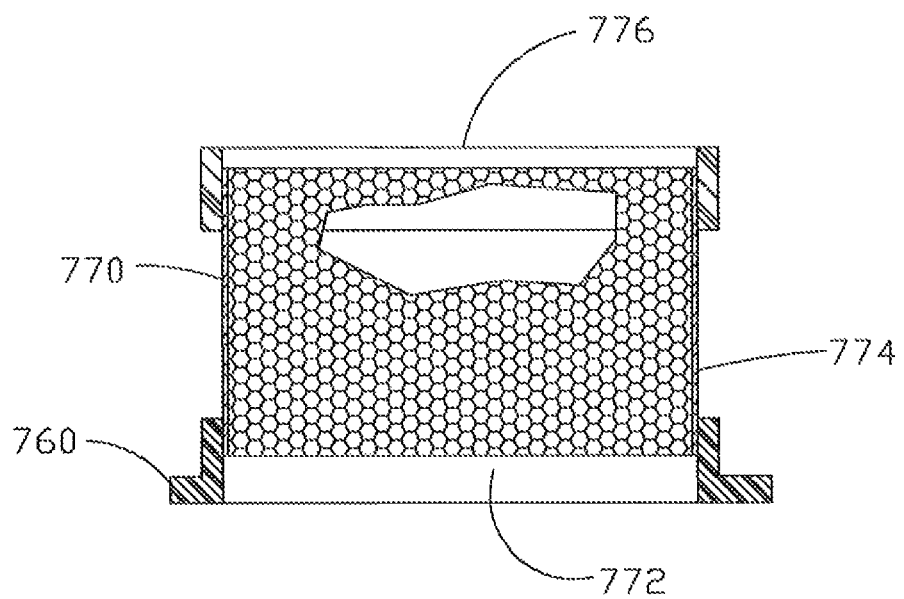

In addition to FIG. 6A and FIG. 6B, the container of the second embodiment is further described in FIG. 7A and FIG. 7B. The container 600 provided with compost 738, bottom section 602 and top section 604 is shown. The bottom cap 606 closes one end of the bottom section 602 while the other end is open having the lower flange 610 extending from its outer periphery. The bottom cap 606 has a bottom wall 708 having a bushing 712 affixed therein defining an inlet opening 714. The bushing 712 has an end external to the container 600 adapted to engage and provide communication with the supply water line 644. The bushing 712 also has an end internal to the container 600 adapted to engage and provide communication with the inlet end 710 of an elongated internal manifold 718. A manifold cap 724 adapted to engage the manifold 718 and provide a watertight seal closes the other end of the manifold 718. The manifold 718 has an outer surface 720 and a circular inner surface 726 defining a space in communication with a plurality of spray nozzles 732 mounted on the outer surface 720. Spray nozzles 732 are also preferably alternately staggered in flights providing even mixing of the compost 738 and resulting slurry. The outer surface 720 is spaced inwardly from a vortex chamber wall 734 of the container 600 defining a vortex chamber 736. A top cap 742 adapted to engage a top spool 764 closes one end of the top section 604 while the other end is open and having a top flange assembly 612 extending outwardly therefrom. The open end of the top section 604 is in communication with the open end of the bottom section 602. The top flange 612 and bottom flange 610 are adapted to releasably engage each other to create a watertight seal during operation, preferably with a gasket 616 provided between the two flanges 610, 612. The top section 604 has an integrated cylindrical filter 758 comprising a filter insert 760 adapted to engage a cylindrical perforated screen 770. The filter insert 760 engages into the top flange assembly 612 and affixes to the open end of the top spool 764 creating a watertight seal. The end of the screen 770 affixed to the filter insert 760 is open and defines a filter inlet opening 772 in communication with the vortex chamber 736. The other end of the screen 770 is closed. A top ring 776 having an internal diameter the same size as the internal diameter of the filter insert 760 engages the other end of the cylindrical screen 770. The top ring 776 facilitates retention of screen 770 shape during operation. The top ring 776 should abut the top wall 744 and is preferably affixed to the top wall 744, defining the closed end of the screen 770 creating a watertight seal. Alternatively, a cap may be used to close the other end of the perforated screen 770. The screen 770 has an outer surface 774 spaced inwardly from an inner surface 756 of the top section 604 and defining a circumferential gap 782. In other embodiments, the filter 758 may comprise a spool piece having one end open engaged in an insert 760 and another end abutting the top wall 744 or closed by a cap. In this alternate filter 758 embodiment, the spool piece is provided with a series of large openings in the spool wall allowing water to flow from the vortex chamber 736 to the circumferential gap 782. The perforated screen 770 is affixed to the inside of the spool to allow water to flow to the circumferential gap 782 while retaining compost 738 in the vortex chamber 736. The top section 604 is further provided with two outlet bushings 746 defining the first outlet 650 and second outlet 652. The outlets 650, 652 are in communication with the circumferential gap 782. In practice, where the container 600 is manufactured from 10-inch schedule 80 PVC pipe, the filter 758 comprises an 8 inch filter insert 760 and perforated screen 770 having perforations with a diameter of thirty-thousandths of an inch each. The open end of the perforated screen 770 is riveted or otherwise affixed to the inside of the insert 760. The outer surface 770 of the perforated screen's 770 other end is affixed to the top ring 776. Additionally, since the manifold 718 extends into the top section 604, nozzles 732 positioned on the portion of the manifold 718 extending into the open end of the filter 758 provide a washing action to clean the perforated screen 770.

Figure 8:
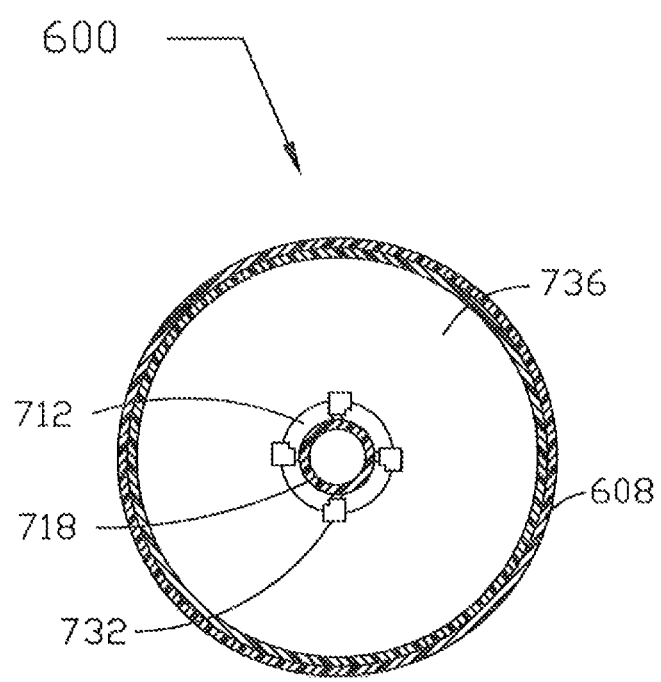
FIG. 8 is a cross sectional view of the second embodiment showing a vortex chamber and internal manifold nozzle arrangement.

FIG. 8 shows the internal arrangement of the manifold 718 and spray nozzles 732 of the second embodiment container 600. The bushing 712 mounted in the bottom section cap 608, is preferably positioned so that its axis coincides with the vortex chamber 736 axis. Spray nozzles 732 preferably mount in four linear rows along the manifold 718 directing their spray in the same counter-clockwise circumferential direction to create a vortex during operation. Spray nozzles 732 having a 90 degree head directing spray along a line parallel to the tangency of their mounting point with the manifold 718 facilitate this arrangement. Some nozzles 732 having straight spray assemblies to generate turbulence and additional agitation may be utilized but are not otherwise described or shown for this embodiment.

Figure 9A:
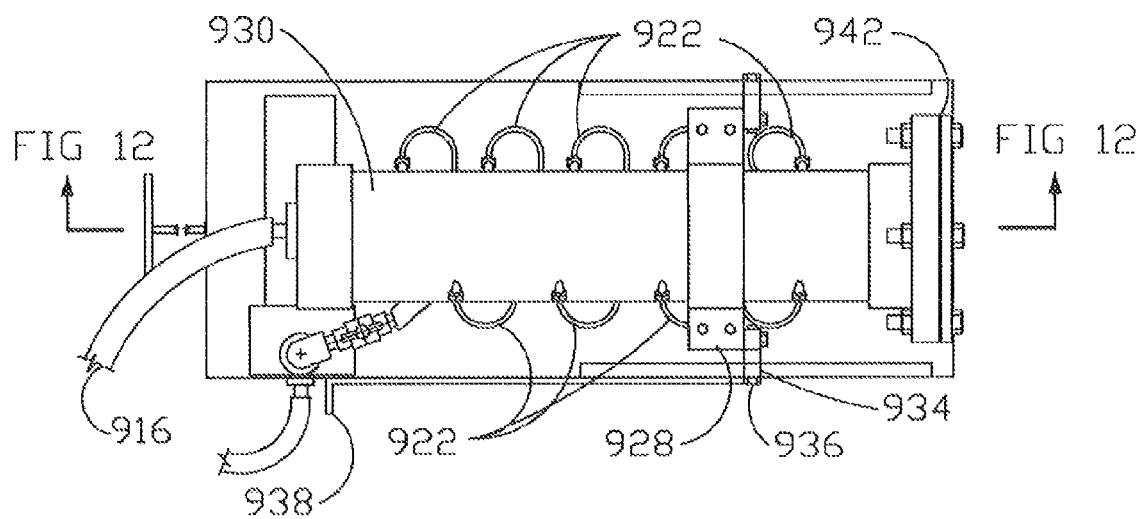
FIGS. 9A and 9B are a plan and elevation view of a third embodiment which operates horizontally.
Figure 9B:
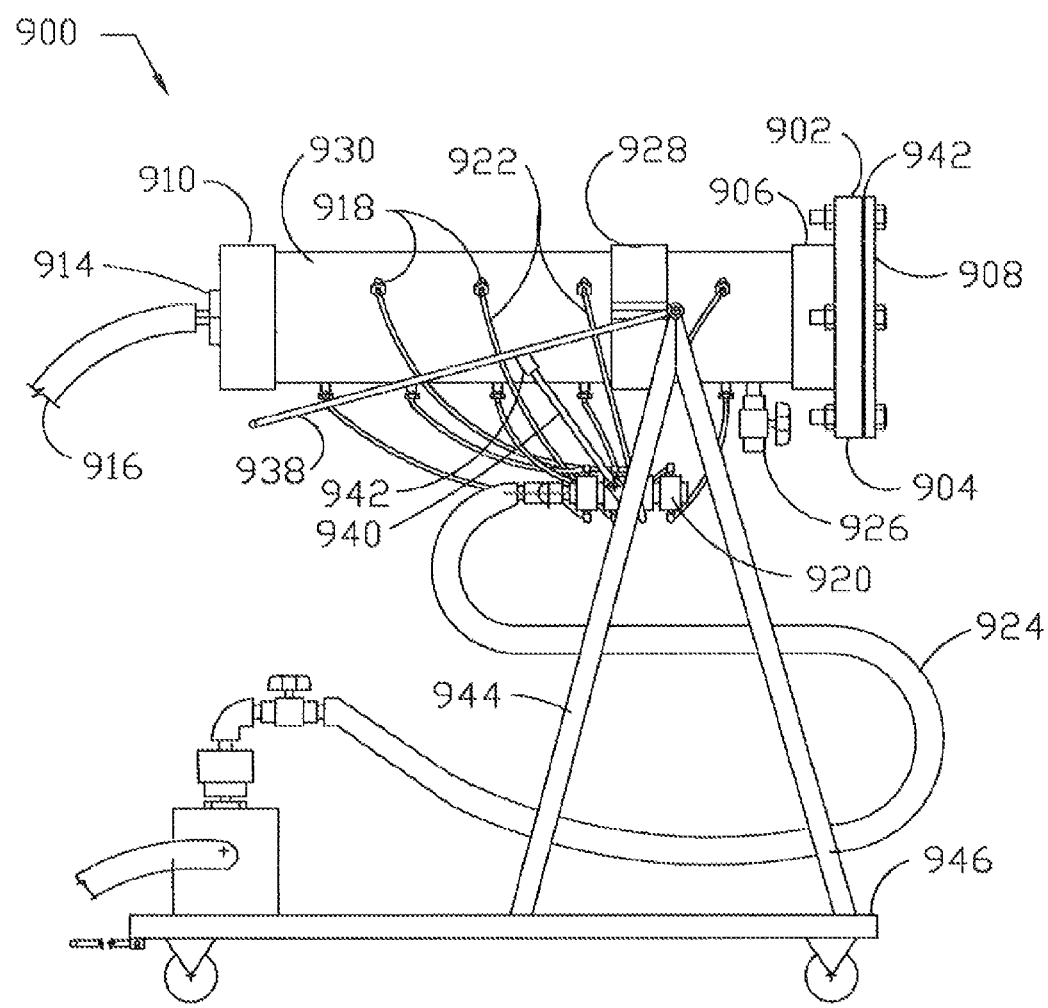

FIGS. 9A and 9B depict a third embodiment of the compost tea apparatus container 900. The external features of this embodiment resemble those of the first described embodiment in FIG. 2A and FIG. 2B. However, in practice this embodiment shows improved results with finer and heavier compost material. In this embodiment, an elongated container 900 is provided having a cap 910 closing one end and a blind flange assembly 902 closing the other end. The blind flange assembly 902 comprises a flange ring 904 engaging an insert 906 that further engages the periphery of the container 900 defining the flanged end. A plate or blind flange 908 is provided releasably coupling to the flange ring 904 with bolts or other mechanical means known in the art such as clamps or compression rings. A gasket 942 is disposed between the flange ring 904 and the blind flange 908 to facilitate a watertight seal. The cap 910 on the other end of the container 900 has a bushing 914 mounted therein defining an outlet providing communication between a recirculation line 916 and the inside of the container 900 (vortex chamber). One or more multi-port manifolds 920 communicate with a supply water line 924 is in communication with a pump feeding water from a water source such as a tote. A plurality of nozzles mounts inside the container 900. A plurality of nozzle supply lines 922 provides communication between the manifold 920 ports and each nozzle. A drain valve 926 having communication with the container's 900 inside protrudes from the container 900 facilitating draining after operation. In operation, the container's 900 axis is aligned horizontally. In this manner, the compost material can spread over the bottom of the container's 900 entire length, facilitating agitation of heavier compost material. A riser clamp 928 hingedly affixed to the a support frame 944 mounted to a movable cart 946 engages the container 900 outer surface 930 allowing rotation about the axis of a hinge assembly 934 having a pin 936 with a stop on one end. A handle 938 having one end affixed to the stop facilitates rotation of the container 900. A tubular handle stand 940 having one end hingedly mounted to the support frame 944 and the other end adapted to cooperatively engage the handle 938 enables the container 900 to remain in a horizontal position during operation.

Figure 10A:
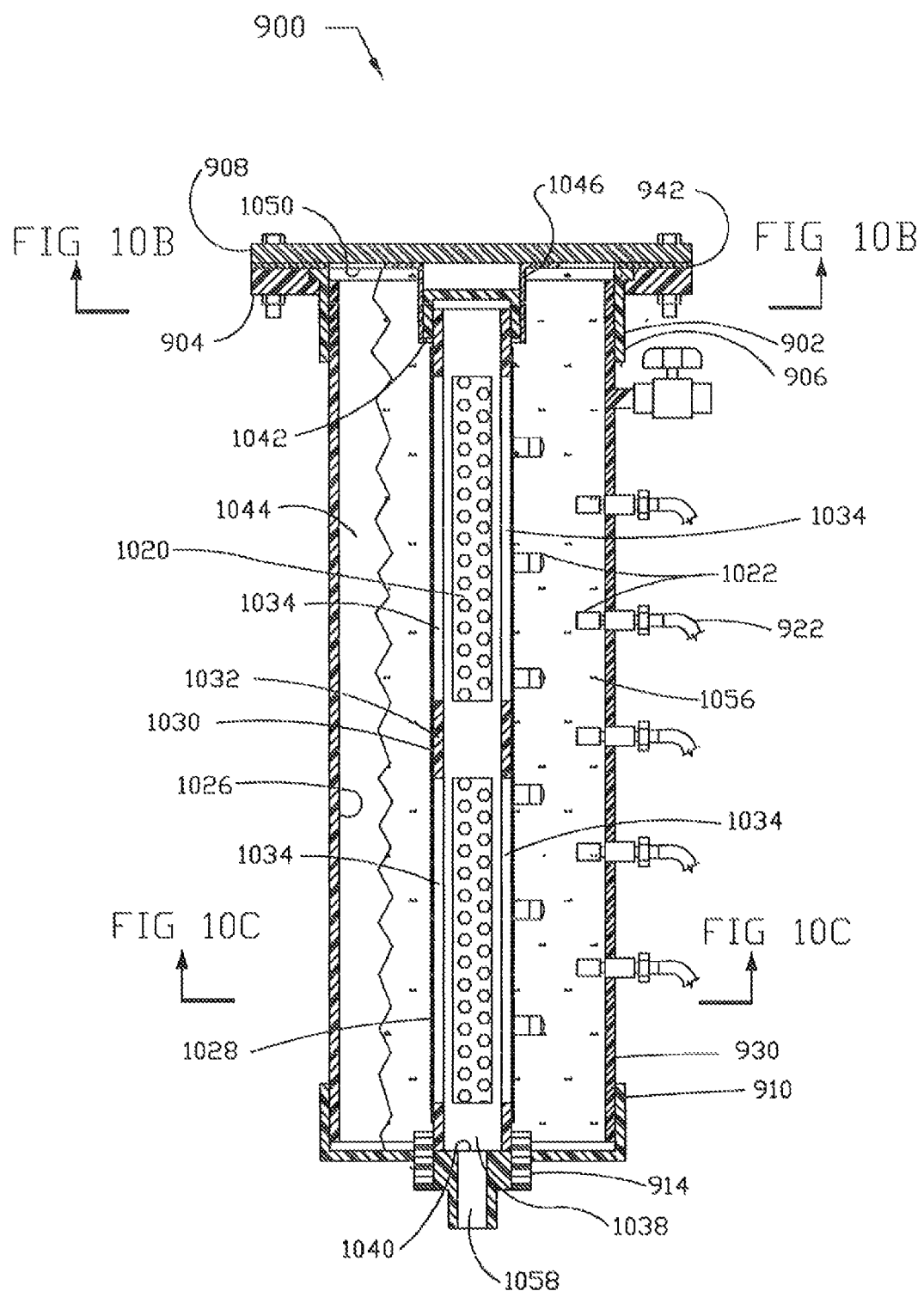
FIG. 10A is a cross sectional view of a third embodiment having an integrated filter with an outlet end.

Referring now to FIG. 10A in addition to FIG. 9A and FIG. 9B, the internals of the third embodiment container 900 are further shown. The container 900 has the blind flange assembly 902 closing one end while the cap 910 closes the other. The flange assembly 902 comprises the flange ring 904, insert 906, blind flange 908, and gasket 942 as previously described. The flange ring 904 affixes to the container's 900 outer surface 930 on the blind flange end while the cap 910 affixes to the container 900's outer surface 930 on the capped end. The cap 910 has a bushing 914 mounted therein defining an outlet 1058. The bushing 914 is adapted to engage a fitting external to the container 900 that is in communication with the recirculation line 916 while also engaging a filter 1020 located inside the container 900. The container 900 has an inner surface 1026 to which a plurality of spray nozzles 1022 mounts. Nozzle supply lines 922 communicate water to the nozzles from the multi-port manifold(s) 920. The filter 1020 in this embodiment comprises an elongated cylindrically formed perforated screen 1030 having two open ends and a filter outer surface 1028. The filter outer surface 1028 is spaced inwardly from the container 900 inner surface 1026 defining a vortex chamber 1044. The screen 1030 has an interior surface defining a sleeve adapted to engage an elongated, hollow cylindrical filter body 1032 having ends extending beyond the cylindrical screen 1030 ends. Rivets, weld, glue, ring clamps, or other suitable joining means may be used to affix the screen 1030 to the filter body 1032. A series of elongated openings in the filter body 1032 define windows 1034 or cut-outs. The filter body 1032 has a filter cap 1042 closing one end. On the other end, a filter outlet end 1038 defines a filter outlet 1040 in communication with the container outlet 1058. In operation, water pressure forces water in the vortex chamber 1044 through the filter screen 1030 at the filter body 1032 windows 1034 which direct the water inside the filter 1020 where the water if further directed toward the filter outlet 1040. Water flows from the filter outlet 1040, through the container outlet 1058, and into the recirculation line 916 in communication with the filter outlet 1040. The blind flange 908 has a top wall 1050 adjacent the vortex chamber 1044 having a retainer ring 1046 centrally affixed thereto. The retainer ring 1046 has an upright member adapted to releasably engage the filter cap 1042. The retainer ring 1046 provides a stable and secure mount for the closed end of the filter 1020 during operation. Compost 1056 material is provided in the vortex chamber 1044. During operation the pump forces water through the spray nozzles 1022 into the vortex chamber 1044. The water mixes with and agitates the compost 1056 creating a slurry, entraining the compost 1056 nutrients and microorganisms in the water. The water fills the vortex chamber 1044 while water pressure forces the water through the filter 1020 as described above.

Figure 10B:
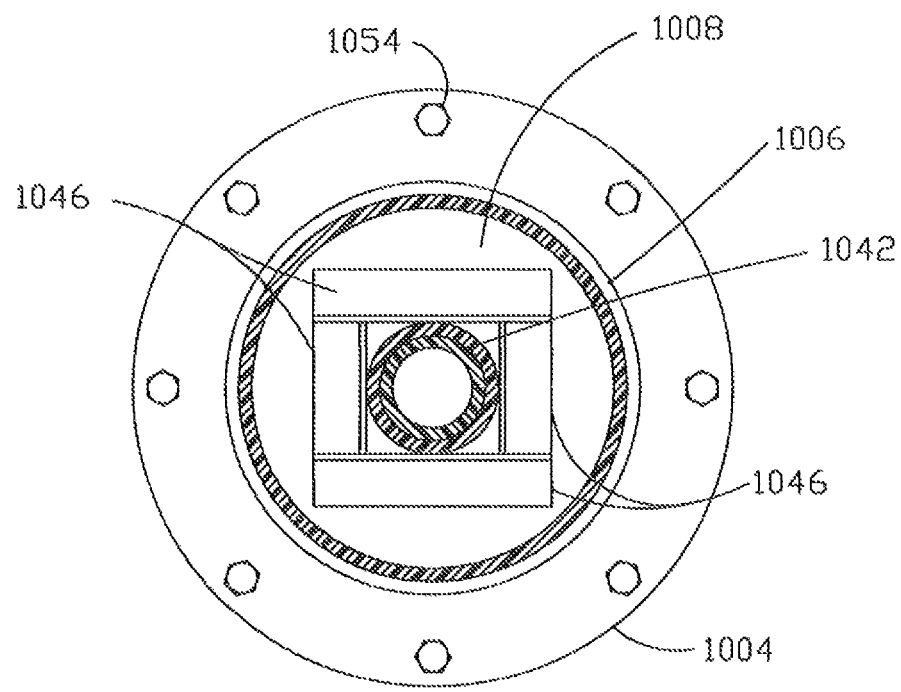
FIG. 10B is a cross sectional view of a third embodiment flanged end.
Figure 10C:
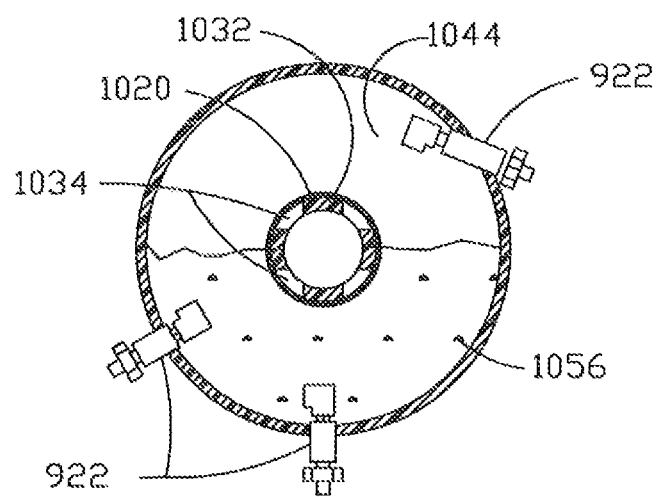
FIG. 10C is a cross sectional view showing a third embodiment nozzle arrangement.

Referring to FIG. 10B to further clarify the flanged end of the third embodiment container 900, the flange insert 906 engaging the flange ring 904 is shown blinded by the blind flange 908 bolted to the flange ring 904. A retainer ring 1046 centrally mounts to the blind flange 908 surface interior to the container. For simplicity the retainer ring 1046 is constructed of four pieces of angle iron having ends abutted together to form a square. The upright member of the angle iron retainer ring 1046 is adapted to cooperatively receive the filter cap 1042 securely and firmly. Alternatively, the retainer ring 1046 could be formed from a single piece of angle by rolling the angle piece to create a circular ring adapted to receive the filter cap 1042. Also, the retainer ring 1046 could be manufactured as a machined or formed donut type ring mounting to the blind flange 908 so long as it has am upright member adapted to receive the filter cap 1042 and secure the filter cap 1042 in place during operation. FIG. 10C shows another view of the third embodiment container 900. Spray nozzles 922 mount inside the container 900 directing spray into the vortex chamber 1044. When the container 900 is in the horizontal operating position rows of nozzles 922 are presented at approximately the 2 O'clock, 6 O'clock, and 8 O'clock positions. The 6 O'clock and 8 O'clock nozzles preferably direct their spray counter-clockwise circumferentially about the vortex chamber 1044 creating a vortex during operation. The 2 O'clock positioned nozzle 922 preferably directs its spray generally in the same counter-clockwise circumferential direction but is also angled toward the filter 1020 to provide a washing action thereby cleaning the top surface of the filter 1020 during operation. Using a nozzle directing spray 90 degrees from the assembly, the preferred 2 O'clock mounting is accomplished by mounting the nozzle assembly 922 at an angle approximately 22 degrees from the tangency of the mounting position with the container 900 wall. The filter 1020 windows 1034 are also visible in this figure as cut-outs in the filter body 1032.

FIG. 11A and FIG. 11B show a fourth embodiment of the device. In this embodiment, the cart, pump, feed water line, A-Frame stand, handle, hinge assembly, pin, and riser clamp configure similarly to the embodiments previously described. In this embodiment. An elongated cylindrical container 1100 has a bottom cap 1104 closing one end and an open end defined by a flange 1110 affixed thereto. A blind flange 1112 adapted to releasably couple with the flange 1110 assembly allows the open end to be closed during operation. A gasket 1114 is provided between the flange 1110 and the blind flange 1112 to facilitate a water-tight seal. The container 1100 has an outer surface 1102 with a portion engaged in the riser clamps, providing support to the container 1100. The bottom cap 1104 has a bushing 1106 affixed therein defining an inlet in communication with one end of a supply water line 1126. The other end of the supply water line 1126 is in communication with the pump and provides water to the container 1100. The container 1100 has a plurality of outlets 1116 and a loop line 1118a, 1118b, 1118c and denoted generally throughout this description as 1118 adapted to communicate with and between each outlet 1116 and a recirculation line 1128. The recirculation line 1128, as discussed in other embodiments, has one end communicating with a tote. The other end of the recirculation line 1128 communicates with the loop line 1118. The loop line 1118, outlets 1116, and container 1100 interior form a parallel circuit directing compost tea from inside the container 1100 toward the recirculation line, which carries the compost tea to the tote. In practice, the loop line 1116 may be one line having multiple inlet branches adapted to communicate with the outlets 1116. FIG. 11E shows one method of constructing the loop line 1118. Using this construction, the loop line 1118 is constructed of several pieces of flex hose 1118a, 1118b, 1118c. A first piece of flex hose 1118a has one end communicating with a nipple 1172 in communication with one of the outlets 1116 designating the beginning of the loop 1118 while the other end communicates with a first tee fitting 1172a in communication with an outlet 1116a. A second piece of flex hose 1118b has one end also communicating with the first tee fitting 1172a and the other end communicating with a second tee fitting 1172b. A third flex hose 1118c has one end adapted to also communicate with the second tee fitting 1172b while the other end communicates with a third tee fitting. This loop pattern continues until the final tee fitting, which communicates with both the last piece of flex hose forming the loop 1118 and the recirculation line 1128.

Figure 11C:
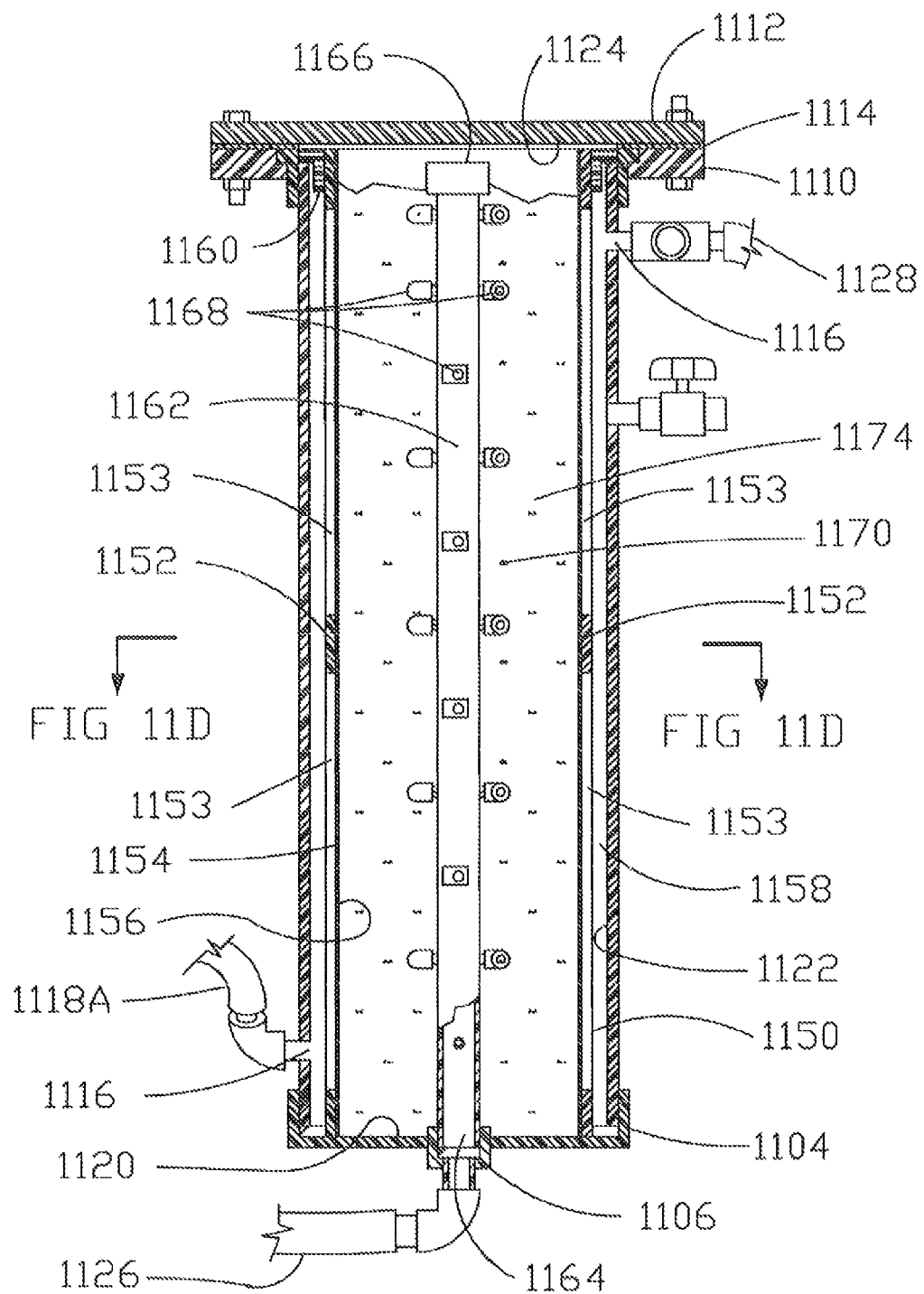
FIG. 11C shows a cross sectional view of a fourth embodiment of the container.
Figure 11D:
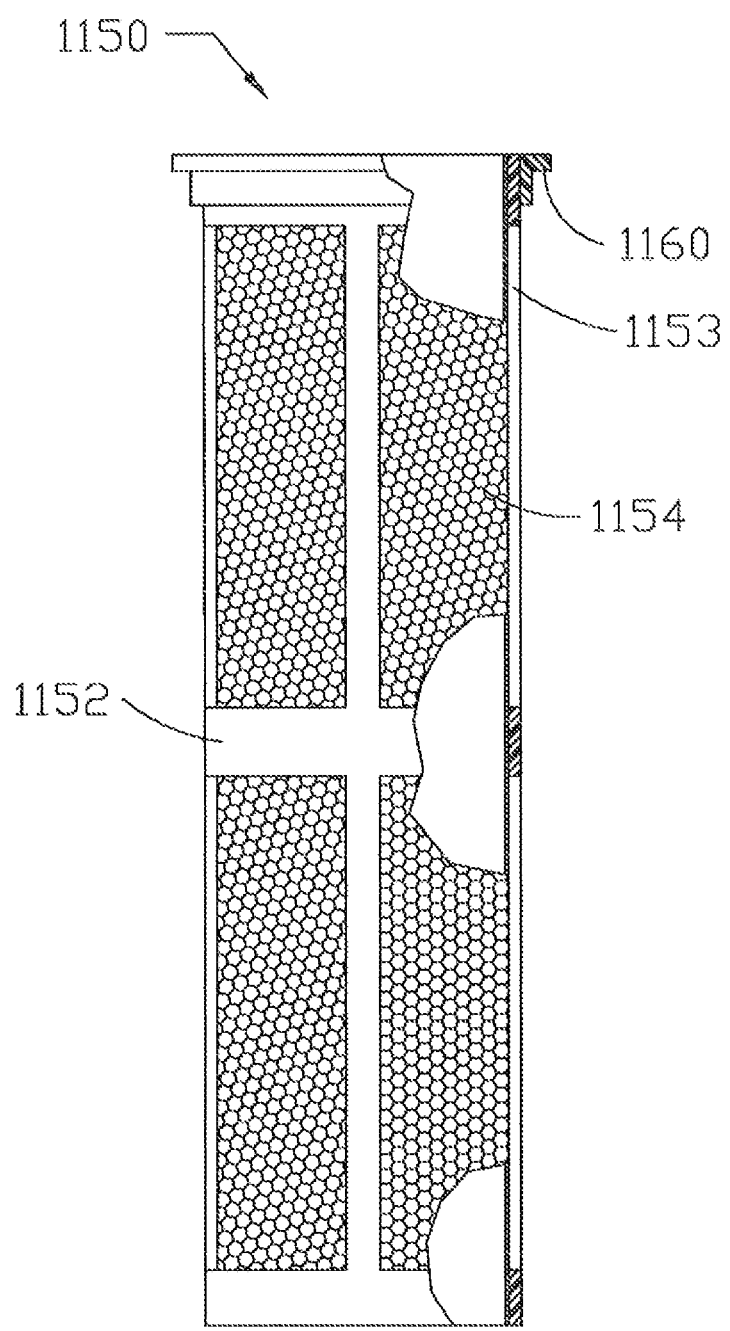
FIG. 11D shows an elevation view of the fourth embodiment filter body lined with perforated screen.
Figure 11E:
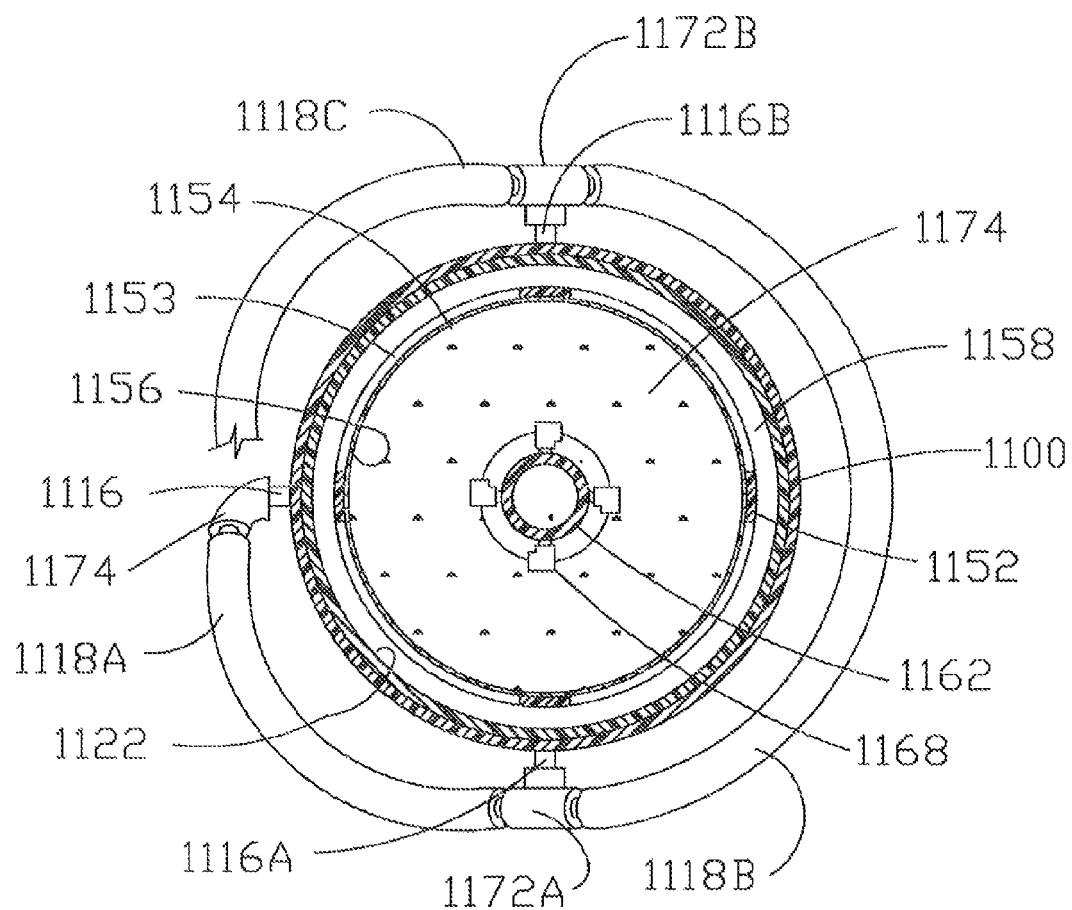
FIG. 11E shows a cross sectional view of the fourth embodiment container showing the circumferential gap and loop line arrangement.

Referring now to FIG. 11C, the bushing 1106 in the bottom cap 1104 has an end external to the container 1100 communicating with the supply water line 1126. The end of the bushing 1106 internal to the container 1100 is in communication with an open end of an elongated manifold 1162 defining a manifold inlet 1164. A manifold cap 1166 closes the other end of the manifold 1162. The manifold 1162 provides communication for water between the manifold inlet 1164 and a plurality of spray nozzles 1168 mounted on the manifold 1162. The spray nozzles 1168 preferably direct spray in a counter-clockwise circumferential direction that is parallel to the tangency of their mounting position on the manifold 1162. The manifold 1162 axis preferably coincides with the container 1100 axis. A filter 1150 comprising an elongated, hollow cylindrical filter body 1152 and a removable perforated screen 1154 is provided inside the container 1100. The filter body 1152 has one end affixed to a bottom wall 1120 of the bottom cap 1104 and an axis coincident with the container 1100 axis. The other end of the filter body 1152 is open having a filter insert 1160 affixed thereto. The flanged end of the container 1100 is adapted to engage the filter insert 1160 which is affixed therein, securing the filter body 1152 to the container 1100. The filter body 1152 has a series of long holes cut or sawn therein defining windows 1153 in the filter body 1152. The filter body 1152 has a filter body outer surface spaced inwardly from an inner surface 1122 of the container 1100 defining a circumferential gap 1158 there-between. The filter body 1152 is adapted to communicably receive the perforated screen 1154 along its entire length therein. The tolerance between the filter body 1152 and the screen 1154 should be sufficient to allow the screen 1154 to slide easily in and out of the filter body 1152, yet securely retain the screen 1154 in position during operation. The screen 1154 has an inner surface 1156 defining a vortex chamber 1174 provided with compost 1170. When the blind flange 1112 is secured to the container flange 1110, the top wall 1124 closes the open end of the screen 1154 and filter body 1152, securing the compost 1170 therein. The outlets 1116 provide communication between the circumferential gap 1158 and the loop line 1118. In operation, compost 1170 is provided inside the screen 1154 vortex chamber 1174 and the blind flange 1112 is releasably joined to container flange 1110. Water from a source is pumped through the water supply line, into the manifold 1162, and out of the spray nozzles 1168. Water from the spray nozzles 1168 soaks the compost 1170 and creates a compost 1170 and water slurry. The spray, under pressure, creates a vortex and separates the nutrients and microorganisms from the compost 1170. The screen 1154 separates the water from the slurry, and the filter body windows 1153 direct the water from the screen 1154 to the circumferential gap 1158, which directs water to the outlets 1116. The outlets 1116 communicate the water to the loop line 1118, which further communicates the water to the recirculation line 1128 and back to a tote, which is preferably the water source feeding the pump. FIG. 11D provides an elevation view of the filter 1150 showing the filter body 1152 lined with the screen 1154. As shown, 8 windows 1153 are provided in the filter body 1152 to maximize screen surface area exposed to the circumferential gap 1158 (FIG. 11C) while providing enough rigidity to facilitate retention of screen 1154 shape during operation. The filter insert 1160 is also shown affixed to one end of the filter body 1152. Referring again to FIG. 11E, the circumferential gap 1158 defined by the filter body 1152 and inner surface 1122 is shown. Water pressure created by spray from the nozzles 1168 when water fills the container 1100 forces the nutrient and microorganism enriched water from the slurry, through the screen 1154 at the windows 1153 into the circumferential gap 1158. The circumferential gap 1158 directs the water toward the plurality of outlets 1116, 1116*a*, 1116*b*, into the loop line 1118 flex hoses 1118*a*, 1118*b*, 1118*c* and into the recirculation line (FIG. 11A and FIG. 11B) in communication with the loop line 1118. Like the other embodiments, the recirculation process continues until the desired levels of compost tea ingredients are reached.

In each of the referenced drawings and embodiments, screen having perforations with a diameter of 30 thousandths of an inch (0.030") each has been found satisfactory to allow water to pass through the filter while separating compost and retaining it in the container. The container may be constructed of 10 inch PVC pipe and fittings having a vortex chamber capable of holding approximately 30 to 40 pounds of compost material. The pump should provide a range of volumetric water flow. Flow ranging from 30 gallons per minute (gpm) and 40 gpm has been found satisfactory, although rates up to 100 gpm have been satisfactorily tested. System operating pressure is preferably 30 to 40 pounds per square inch (psi). However, depending on system materials and designs using higher pressure ratings are possible and provide similarly satisfactory results. The time interval to produce a 275 gallon volume of high quality compost tea using the devices and methods described herein is approximately 10 to 12 minutes. The pump is preferably provided with a timer, automating the recirculation cycle and providing consistency in operation between batches. Larger volumes can be produced by increasing container and compost volume and adjusting timing intervals appropriately.

As has been demonstrated, the present invention provides a novel device and method for compost tea production. The present invention provides high quality tea in much shorter times than existing methods, overcoming many of the obstacles and difficulties associated with using compost tea. The prior art does not provide a means of producing quality compost tea in approximately 10 to 12 minutes for a batch of compost tea. Nor does the prior art teach a method of separating micro-organisms and nutrients from compost in a separator container under pressure. Nor does the prior art teach highly portable devices capable of producing large scale quantities of compost tea in short durations.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

I claim:

1. An Apparatus for producing compost tea comprising:
   An anaerobic single chamber elongated container having a closed end and a blind flange releasably coupled to the opposite end;
   at least one outlet;
   an inlet disposed in the closed end in fluid communication with an external pressurized water source;
   a generally cylindrical screen disposed between the inlet and each of the at least one outlet, the screen extending the length of the container upwardly through the container from the container closed end to an insert abutting the blind flange, the screen having an inner surface defining a vortex chamber therein;
   an elongated manifold extending outwardly into the vortex chamber from a manifold inlet receiving pressurized water from the inlet;
   a plurality of spray nozzles mounted on the manifold, each of the spray nozzles positioned to spray the pressurized water away from the manifold toward compost retained within the vortex chamber to thereby create a vortex within the vortex chamber, the vortex causing the compost to mix with the pressurized water to produce the compost tea; and the screen having a cross-sectional area less than a cross-sectional area of the container and being spaced apart from an interior wall of the container, thereby defining an annular circumferential gap there between, the circumferential gap in fluid communication with the at least one outlet responsive to passage of the pressurized water from inside the screen to the circumferential gap, thereby enabling the compost tea to be released from the container through the at least one outlet.

* * * * *